United States Patent [19]
Cohen et al.

[11] Patent Number: 5,788,888
[45] Date of Patent: Aug. 4, 1998

[54] THREE-DIMENSIONAL ARTICLES OF LYOTROPIC POLYMERS AND METHODS FOR THE PREPARATION

[75] Inventors: Arie Cohen; Myrna Serrano, both of Midland; Norman L. Madison, deceased, late of Midland, by Rita A. Madison, legal representative; Peter E. Pierini, Midland; Ritchie A. Wessling, Midland; Donald E. McLemore, Midland; Donald L. Schmidt, Midland, all of Mich.

[73] Assignee: The Dow Chemical Company, Midland, Mich.

[21] Appl. No.: 330,898

[22] Filed: Oct. 28, 1994

Related U.S. Application Data

[63] Continuation-in-part of Ser. No. 56,442, Apr. 30, 1993, abandoned.

[51] Int. Cl.$^6$ .................................................. B29C 55/12
[52] U.S. Cl. .................. 264/28; 204/29.1; 204/233; 204/257; 204/331.12; 204/331.19; 204/344
[58] Field of Search ................... 264/29.1–29.7, 264/331.11, 331.12, 184, 233, 234, 344, 345, 257, 331.19

[56] References Cited

U.S. PATENT DOCUMENTS

| | | |
|---|---|---|
| 3,969,430 | 7/1976 | Kalnin et al. . |
| 4,113,683 | 9/1978 | Kalnin et al. . |
| 4,401,590 | 8/1983 | Yoshimura et al. ............... 264/29.6 |
| 4,458,041 | 7/1984 | Chernikhov et al. . |
| 4,555,426 | 11/1985 | Roth et al. . |
| 4,598,099 | 7/1986 | Trouw . |
| 4,606,875 | 8/1986 | Chenevey et al. . |
| 4,810,730 | 3/1989 | Latinski et al. . |
| 4,845,183 | 7/1989 | Mueller et al. . |
| 4,857,255 | 8/1989 | Imanishi et al. ............... 264/184 |
| 4,915,984 | 4/1990 | Murakami ............... 264/29.6 |
| 4,939,215 | 7/1990 | Mueller et al. . |
| 4,983,244 | 1/1991 | Murakami et al. ............... 264/29.6 |
| 5,011,753 | 4/1991 | Mueller et al. . |
| 5,021,517 | 6/1991 | Wang et al. . |
| 5,030,706 | 7/1991 | Harris et al. . |
| 5,064,019 | 11/1991 | Murakami et al. ............... 181/170 |
| 5,070,153 | 12/1991 | Alvarez et al. . |
| 5,071,948 | 12/1991 | Khanna . |
| 5,075,392 | 12/1991 | Harris et al. . |
| 5,089,568 | 2/1992 | Harris et al. . |

(List continued on next page.)

FOREIGN PATENT DOCUMENTS 6426646 1/1989 Japan .

OTHER PUBLICATIONS

Denny, L. R. et al., "The Preparation, Thermomechanical Properties and Applications of High Temperature Thermoplastic Polybenzoxazoles Containing Hexafluorinated Moieties," pp. 186–197, given at University of Dayton Research Institute, Advanced Materials: Looking Ahead to the 21st Century, Boston, Massachusetts, USA, 6–8 Nov. (1990). (Abstract).

Banyavichus, R. B. et al., "Mechanical Properties of Niplon-2," *Plast. Massy*; No. 10 (1980) pp. 26–7. (Abstract).

*Chemical Abstract*, vol. 90, p. 40 (1979) 90:104891r.

(List continued on next page.)

*Primary Examiner*—Catherine Timm
*Attorney, Agent, or Firm*—Margaret M. Brumm; Ann K. Galbraith

[57] ABSTRACT

Described is a process for preparing a three-dimensional article of a lyotropic polymer comprising the steps of (a) forming a shaped article of a liquid crystalline solution of a lyotropic polymer; (b) washing the shaped article with a washing fluid under conditions sufficient to reduce the solvent content of the article to less than about 2,000 parts per million, wherein the dimensions of the washed article are no less than 0.05 inches by 0.05 inches by 0.05 inches. Such articles are useful for many applications, particularly those requiring fire- and/or heat-resistance.

17 Claims, 2 Drawing Sheets

U.S. PATENT DOCUMENTS

| | | |
|---|---|---|
| 5,137,986 | 8/1992 | Uy . |
| 5,151,489 | 9/1992 | Harris et al. . |
| 5,196,259 | 3/1993 | Pierini et al. . |
| 5,217,809 | 6/1993 | Hwang et al. . |
| 5,244,617 | 9/1993 | Murphy et al. . |
| 5,248,721 | 9/1993 | Dixit et al. . |
| 5,273,823 | 12/1993 | Hwang et al. . |
| 5,292,469 | 3/1994 | Bowman et al. . |
| 5,292,470 | 3/1994 | Reddy et al. .................. 264/331.12 |
| 5,302,334 | 4/1994 | Pierini et al. . |
| 5,443,859 | 8/1995 | Nagata ................................ 24/29.6 |

OTHER PUBLICATIONS

*Chemical Abstract*, vol. 101, p. 40(1984) 101:39413r.
*Chemical Abstract*, vol. 105, p. 31 (1986)105:24045t.
*Chemical Abstract*, vol. 110, p. 23 (1989) 110:213676b.
*Chemical Abstract*, vol. 114, p. 19 (1991) 114:229672r.
*Derwent Publications*, 85–162188/27.
*Derwent Publications*, 89–073458/10.
*Derwent Publications*, 89–203126/28.
*Derwent Publications*, 91–087185/12.
*Derwent Publications*, 91–283856/39.
*Derwent Publications*, Access No. 73–31863U/22.
*Derwent Publications*, Access No. 73–31862U/22.
*Derwent Publications*, Access No. 93–018102/02.
*Derwent Publications*, Access No. 54238S–A.
*Derwent Publications*, Access No. 22347Q.
*Derwent Publications*, Access No. 26943Q.
*Derwent Publications*, Access No. 93–214126/26.
*Polymer*, 29, No. 5, May 1988, pp. 825–828.
*Buckely, Alan et al., *Enc. of Poly. Sci. & Eng.*, vol. 11, pp. 601–635 (1988).
*Monks, Richard, *Plastics Technology*, vol. 38, No. 3, pp. 40–45 (1992).
Milewski, John, *A Study of the Packing of Fibers and Spheres*, pp. 1–121 (1973).
Wang, C. S. et al., *1989 Materials Research Society*, vol. 134, pp. 559–567.
Sandor, R. B., *High Performance Polymers*, vol. 2, No. 1 (1990).

THREE-DIMENSIONAL ARTICLES OF LYOTROPIC POLYMERS AND METHODS FOR THE PREPARATION

CROSS-REFERENCE TO RELATED APPLICATION

This invention is a continuation-in part of U.S. patent application Ser. No. 08/056,442, filed on Apr. 30, 1993, now abandoned, which is hereby incorporated by reference in its entirety.

BACKGROUND OF THE INVENTION

This invention relates to the preparation of three-dimensional articles and composite articles from solutions of lyotropic polymers. More specifically, this invention relates to the preparation of three-dimensional articles and composite articles from acid solutions of lyotropic polymers, which polymers are thermally stable up to a temperature of at least about 200° C., such as polybenzoxazole or polybenzothiazole polymers and aromatic polyamides.

Methods for the preparation of fibers and films from certain lyotropic polymers are known. While the particular processes and process conditions for the preparation of such articles are unique to each type of polymer, such methods generally comprise the steps of extruding the polymer under relatively high shear conditions to form an extrudate with a relatively small cross-sectional dimension, and then coagulating and washing the extrudates to remove most of the solvent present.

SUMMARY OF THE INVENTION

In one aspect, this invention is a process for preparing a three-dimensional article of a lyotropic polymer comprising the steps of a) forming a shaped article of a liquid crystalline solution of a lyotropic polymer;

b) washing the shaped article with a washing fluid under conditions sufficient to reduce the solvent content of the article to less than about 2,000 parts per million, wherein the dimensions of the washed article are no less than 0.05 inches by 0.05 inches by 0.05 inches.

In a second aspect, this invention is an article comprised of a lyotropic polymer with dimensions of at least about 0.05 inches in thickness, 0.05 inches in width, and 0.05 inches in length.

DETAILED DESCRIPTION OF THE INVENTION

Suitable lyotropic polymers for use in the present invention include those which have a molecular weight and/or inherent viscosity sufficient to permit a lyotropic solution of the polymer to be shaped into a three dimensional article which will have the minimum dimensions recited above after the majority of the solvent is removed from the article. In addition, the molecular weight and/or inherent viscosity of the polymer should also preferably be high enough so that the final article (after washing and drying) is not friable under the conditions under which it is used; however, the particular molecular weight or inherent viscosity which is desirable may vary between polymers. Examples of suitable polymers include lyotropic polybenzoxazole, polybenzothiazole, aromatic polyamides, polyoxamides, polyhydrazides, polyoxadiazoles, polyamide-hydrazides, and polyazomethines. Each polymer preferably contains an average at least about 25 polymer repeat units, more preferably at least about 50 polymer repeat units and most preferably at least about 100 polymer repeat units.

The solvent portion of the liquid crystalline solution of the lyotropic polymer may be any solvent in which the particular polymer will form a liquid crystalline solution. Preferably, the solvent used to prepare a solution of the polymer is a protic acid, although non-protic solvents such as N-methyl pyrrolidone may also be useful for forming liquid crystalline solutions of some polymers, such as certain aromatic polyamides. Examples of protic acids include sulfuric acid, polyphosphoric acid, phosphoric acid, methanesulfonic acid, chlorosulfonic acid, fluorosulfonic acid, and the like, which are also referred to hereafter as "solvents". The term "dope" or "polymer dope" as used hereafter refers to a liquid crystalline solution of the lyotropic polymer. The concentration of the polymer in the dope is preferably as high as possible so that there is less solvent to wash from the article. The maximum concentration is limited primarily by practical factors, such as polymer solubility, dope viscosity, and handling characteristics. After the dope is prepared, it may optionally be stored at ambient temperatures under nitrogen until ready for use.

Preferably, the lyotropic polymer has a glass transition temperature ($T_g$, as may be determined by differential scanning calorimetry) of at least about 200° C., more preferably at least about 300° C., and most preferably at least about 400° C. However, several types of polymers referred to above, such as certain polybenzoxazoles and polybenzothiazoles, may not show a glass transition at any temperature prior to decomposing. In such cases, the temperature at which the polymer begins to show a weight loss of greater than about ten percent after heating the polymer at such temperature for up to 30 minutes (as may be determined by thermal gravimetric analysis) is preferably at least as high as the glass transition temperatures referred to above.

Polybenzoxazole, polybenzothiazole and random, sequential and block copolymers of polybenzoxazole ("PBO") and polybenzothiazole (collectively, "polybenzazole" or "PBZ") are described in references such as Wolfe et al., *Liquid Crystalline Polymer Compositions, Process and Products*, U.S. Pat. No. 4,703,103 (Oct. 27, 1987); Wolfe et al., *Liquid Crystalline Polymer Compositions, Process and Products*, U.S. Pat. No. 4,533,692 (Aug. 6, 1985); Wolfe et al., *Liquid Crystalline Poly(2,6-Benzothiazole) Compositions, Process and Products*, U.S. Pat. No. 4,533,724 (Aug. 6, 1985); Wolfe, *Liquid Crystalline Polymer Compositions, and Products*, U.S. Pat. No. 4,533,693 (Aug. 6, 1985); Evers, *Thermooxidatively Stable Articulated p-Benzobisoxazole and p-Benzobisthiazole Polymers*, U.S. Pat. No. 4,359,567 (Nov. 16, 1982); Tsai et al., *Method for Making Heterocyclic Block Copolymer*, U.S. Pat. No. 4,578,432 (Mar. 25, 1986); 11 Ency. Poly. Sci. & Eng., *Polybenzothiazoles and Polybenzoxazoles*, 601 (J. Wiley & Sons 1988) and W. W. Adams et al., *The Materials Science and Engineering of Rigid-Rod Polymers* (Materials Research Society 1989), which are incorporated herein by reference.

The polybenzazole polymer preferably consists essentially of either AB-polybenzazole monomer units or AA/BB-polybenzazole monomer units, and more preferably consists essentially of AA/BB-polybenzazole monomer units, as such terms are defined in the above-cited references. The molecular structure of the polybenzazole polymer may be rigid rod, semi-rigid rod or flexible coil. It is preferably rigid rod in the case of an AA/BB-polybenzazole polymer or semi-rigid in the case of another type of polybenzazole polymer made up of "AB monomer units" known as an AB-polybenzazole polymer. Azole rings within the polymer are preferably oxazole rings. Units within the polybenzazole polymer are chosen so that the polymer is lyotropic liquid-crystalline, which means it forms liquid-crystalline domains in solution when its concentration exceeds critical concentration, for a given average molecular weight and solvent at a given temperature.

The inherent viscosity of lyotropic liquid-crystalline AA/BB-polybenzazole polymers is preferably in the range of 10 to 60 dL/g (as measured in methanesulfonic acid at 25° C. and a 0.05 g/dL concentration), but is preferably les than about 45 dL/g.

The solvent portion of the polybenzazole dope is preferably polyphosphoric acid or methanesulfonic acid, and is more preferably polyphosphoric acid. The concentration of the polymer is preferably at least about 7 weight percent, more preferably at least about 10 weight percent and most preferably at least about 14 weight percent, but is preferably no greater than about 30 weight percent.

Suitable polybenzazole polymers or copolymers and dopes can be synthesized by known procedures, such as those described in U.S. Pat. Nos. 4,533,693; 4,772,678; 4,847,350; Ledbetter et al., "An Integrated Laboratory Process for Preparing Rigid Rod Fibers from the Monomers," *The Materials Science and Engineering of Rigid-Rod Polymers* at 253–64 (Materials Res. Soc. 1989); U.S. Pat. Nos. 5,089,591; 5,194,568; 5,219,981; and 5,233,014, all of which are incorporated herein by reference in their entirety. Preferably the polybenzazole polymer is prepared from terephthalic acid and 4,6-diaminoresorcinol, 2,5-diaminohydroquinone, or 2,5-diamino-1,4-dithiobenzene, or salts thereof.

Suitable aromatic, lyotropic polyamides for use in the process of the invention include any lyotropic polymer containing amide linkages between aromatic rings, such as poly(p-phenyleneterepthalamide) and poly(p-benzamide). Preferably, the polymer has an inherent viscosity of at least about 0.5 dL/g, more preferably at least about 1.0 dL/g, and most preferably at least about 2 dL/g, measured in concentrated sulfuric acid at a temperature of about 25° C. and a concentration of 0.2 g/dL. Such polymers may be prepared by the reaction of aromatic diamines and aromatic diacid chlorides, either by a low temperature polycondensation process, or by direct polycondensation of aromatic diacids in solution using activating agents such as triphenyl phosphites. Examples of suitable polymers and methods for their preparation are known and are described in the *Encyclopedia of Polymer Science and Engineering*, Vol. 11, pp. 381–409 (1988), which is hereby incorporated by reference. After the polymer is prepared, it may be isolated and redissolved in a suitable solvent, such as sulfuric acid, which allows the resulting dope to be processed and washed.

Forming the Molded Article

To carry out the process of the first aspect of invention, the polymer dope is first formed into a three-dimensional article having the minimum dimensions recited above. The three-dimensional article may be for example, an extrudate, a molded article, or a composite of polymer and fibers. These may be formed, for example, through typical extrusion or molding techniques, or by preparing a composite of one or more layers of extrudate and fibers. Preferably, the dope is extruded or molded under conditions which moderate or minimize the degree of alignment or unidirectional orientation of the polymer chains, since such orientation tends to increase the amount of time necessary to wash the article.

If a PBZ article is to be prepared by extrusion, the dope is preferably first homogenized and/or degassed by mixing at 180° C. for a period of time that typically lasts for up to three hours. Once the has been mixed and degassed sufficiently within the extruder it is extruded through the extrusion die to form a three dimensional structure. Elevated temperatures may be used in the extruder to control the viscosity of the dope. For polybenzazole dope, the temperature is preferably at least about 150° C., more preferably at least 155° C., and most preferably at least about 160° C.; and is preferably no greater than about 200° C., more preferably no greater than about 195° C., and most preferably no greater than about 180° C.

The extrusion can take place with the extruded three-dimensional article exiting the extruder either in a horizontal manner or a vertical manner. Once the desired length of extrudate has been separated from the rest of the extrudate, and the shaped article formed thereby, it is preferably placed on a nonadhering surface and allowed to equilibrate to room temperature, for easier handling.

If the shaped article is formed by molding, this may be carried out by pouring or extruding the solution into a mold and applying pressure or shear to the solution, if necessary, sufficient to cause the dope to fill the cavity of the mold. If the viscosity of the dope is lower at elevated temperatures, the temperature of the mold is preferably high enough to allow the dope to flow under relatively low pressure, or shear and fill out the mold. The desired temperature will depend upon the viscosity of the polymer dope and complexity of mold shapes but will typically range from 70° C. up to the decomposition temperature of the polymer. The molding process is preferably carried out by increasing the pressure upon the dope in the mold cavity as the temperature of the dope inside the mold increases. The mold pressure is preferably in the range of from about 20 to 80 psi.

Once the polymer dope charge has filled the entire mold cavity, the shaped article is preferably allowed to cool to room temperature within the closed mold. While not critical, such cooling of the dope advantageously helps the shaped article to hold its shape during washing and allows it to be more easily removed from the mold. The shaped article may be more easily removed from the mold if there is difference between the thermal expansion coefficients of the dope and the mold, and the mold is cooled relatively quickly using dry ice.

Figure 1:
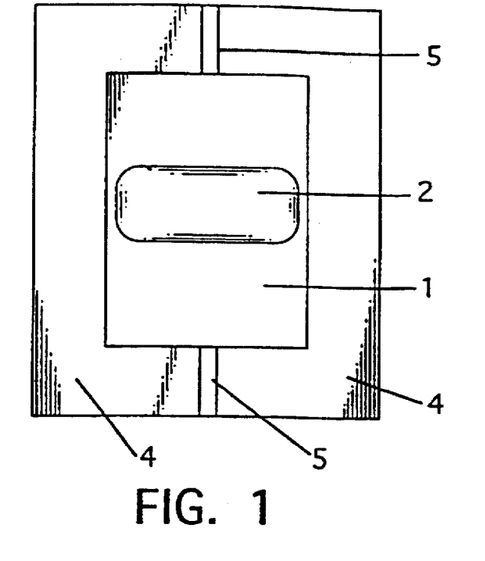
FIG. 1 shows the top view of a mold for forming shaped articles.
Figure 2:
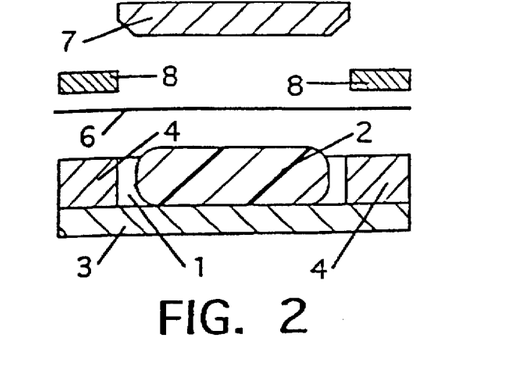
FIG. 2 shows the side view of a mold for forming shaped articles.

An example of a suitable mold cavity is shown in FIGS. 1 and 2. This mold has an open space (the mold cavity) (1), into which the segment of polymer dope (2) is placed; a bottom plate (3), two frame pieces (4), and two vents (5). A side view of the mold (FIG. 2) shows the mold cavity, bottom plate, and a diaphragm (6) made out of a film which can withstand the high temperatures and pressures associated with the molding processing, such as Upilex™ film (a polyimide film available from Ube Industries LTD, Japan). On top of the mold cavity an anvil (7), and a guide for the anvil (8) and is shown, which are used to apply pressure to the polymer dope in the mold (which are not shown in FIG. 1. The frame pieces are preferably secured to the bottom plate. The bottom plate, frame pieces, anvil, and anvil guide may be prepared from any material, but are preferably metal.

If the polymer dope is to be used to prepare a composite of lyotropic polymer as a matrix and fibrous reiforcement (including fabrics), sheets of the polymer solution are first prepared with a thickness of at least about 0.05 inches, more preferably at least about 0.125 inches. Thereafter, the reinforcement may then be pressed into one sheet of the dope or pressed between two sheets of the dope. Preferably, the sheets are not stretched prior to assembly of the multilayer article, although they may be drawn slightly (i.e., less than 25%) during extrusion to facilate the use of larger size dies.

After the multilayer composite is assembled, pressure is preferably applied to the composite so that the polymer dope encapsulates the fibers and forms a matrix surrounding them. The pressure applied to the composite is preferably in the range of from about 50 to about 500 psi, and the time needed to encapsulate the fibers will depend on the viscosity of the dope. Examples of suitable reinforcements include fiberglass and carbon fiber fabrics. Depending on the tightness of weave of any fabric used, its thickness, and the viscosity of the dope, processing conditions for encapsulation of the fibers are preferably in the range of 150° C. to 250° C., and pressures are preferably in the range of from 50 to 500 psi.

The molded article formed from the dope solution (unwashed) has the minimum dimension of 0.05 inches in thickness, 0.05 inches in width, and 0.05 inches in length. It is not necessary that the article be in the shape of a cube or rectangular box, since it is possible to mold the dope into more complex shapes. However, in the case of complex shapes, the minimum dimensions referred to above mean that at least one portion of the dope or polymer in the article has such dimensions, even though such portions may be partially or totally surrounded by additional dope or polymer contained in the article.

Figure 3:
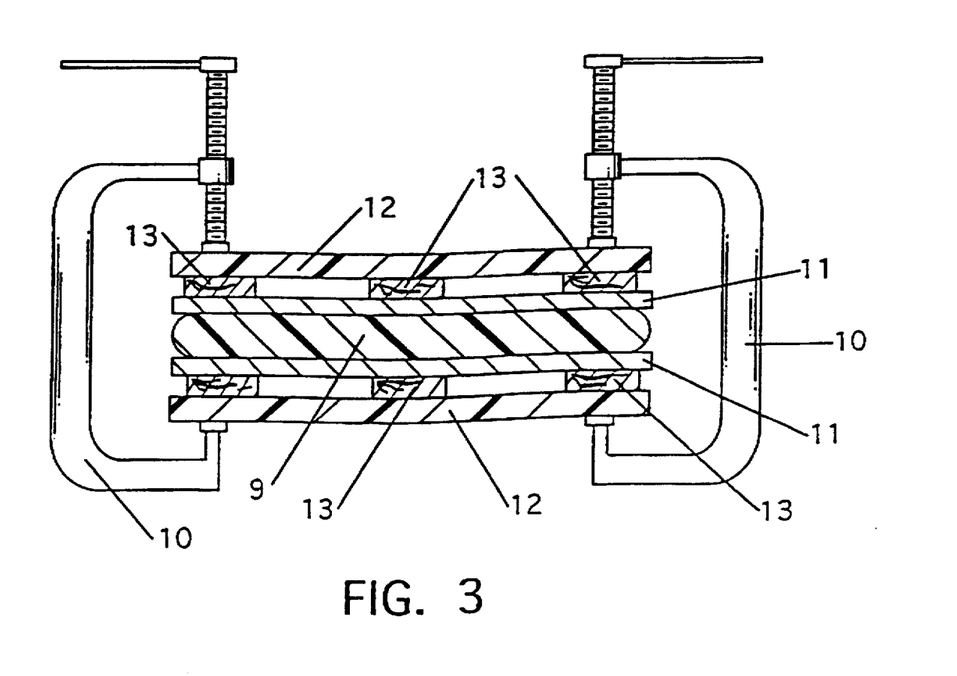
FIG. 3 shows a support apparatus for washing a molded article.

In the second step of the process of the invention, the shaped article is washed with a washing fluid under conditions sufficient to reduce the solvent content of the article to less than about 2,000 parts per million, thereby reducing its dimensions and creating a porous structure. Due to the tendency of the shaped solution to distort if left in the washing bath unrestrained, the article is preferably confined sufficiently during washing to prevent substantial distortion of its shape. The shaped solution may be confined using any suitable technique or apparatus which also allows the washing fluid to contact the solution and remove the solvent therefrom, but is preferably confined using a structure made from porous metal plates (available from Mott Mettalurgical, Farmington, Conn.). An example of such a structure is illustrated in FIG. 3. Of course, as the percentage of surface area exposed to the washing fluid increases, the article will be less confined and wash more quickly, but may have a more distorted shape after solvent removal. In addition, as the solvent content of the article decreases it may have less of a tendency to distort, so that the article may be washed with less restraint or without restraint towards the end of the washing step, if desired.

As illustrated in FIG. 3, a molded article (9) is supported between clamps, (10) by two porous metal plates, (11) on either side of the article. The porous plates are supported by two rigid plates (12), and a plurality of spacers (13). The use of spacers (small plates) permits the washing fluid to contact a portion of the porous plate. The rigid plates and spacers may be made from any suitable material, such as plastics, metals, or wood.

The washing of the solvent from the shaped article is continued until the level of residual solvent in the shaped article is acceptable. The amount of residual solvent that is acceptable may depend upon the end use of the article, since the acid solvent may be corrosive to materials which may come in contact with the article. Preferably, the amount of residual solvent is less than about 3000 ppm, more preferably less than about 1500 ppm, and most preferably less than about 500 ppm.

Suitable washing fluids include water, steam, mixtures of water and one or more protic acids, as well as any liquid which will exchange itself with the solvent acid in the polymer solution, and which may be easily removed from the polymer solution upon drying and/or the application of pressure to the polymer/washing fluid solution such as, for example, methanol or acetone. Preferably, the washing fluid is water or steam. However, if steam is used to wash the article, it may be more efficient to wash the article with water first, since the solvent concentration tends to drop very quickly during the initial stages of washing and water will more effectively remove larger quantities of solvent from the article.

The washing step may be carried out in any convenient manner, such as by soaking the article in a circulating bath of the washing fluid. The duration of the washing step will depend on the particular polymer employed, the temperature of the bath, the concentration of the solvent in the article and the washing bath, and the thickness of the part, but will typically be in the range of from about 2 minutes to about 2 weeks. The temperature of the washing bath is preferably in the range of from about 0° C. up to 100° C., more preferably from 5° C. up to 80° C. and most preferably from 10° C. up to 25° C. Cooler washing temperatures will result in less distortion of the shape of the part, although longer washing times are necessary at such lower temperatures for removal of the solvent.

If a water/acid mixture is used as the washing fluid, the concentration of acid is preferably kept to no more than about 30 weight percent acid, preferably no more than about 15 weight percent acid, and most preferably no more than about 5 weight percent acid, although higher acid concentrations will be effective for removing solvent in the initial stages of the washing process, since the initial solvent concentration in the polymer solution is also higher.

The degree of shrinkage observed during washing may depend upon the degree of orientation of the polymer chains achieved during processing. A typical range of shrinkage for these articles is on the order of 5 percent in the direction of orientation and on the order of 50 percent in the directions that are transverse to the direction of orientation.

After washing, the three-dimensional article is preferably dried to remove as much washing fluid as is practical. After drying, the article preferably comprises less than about 5 percent by weight of the washing fluid, more preferably less than about 0.1 percent. Both reduced pressures and elevated temperatures may be used to initiate the drying process. Drying may be performed at ambient temperature, but is preferably carried out at a temperature in the range of from about 100° to 300° C., while drying pressures can range from contact pressure to an excess of 300 psi. Drying can be performed, for example, in a hot press at elevated temperatures using a sheet of foil or high temperature film such as Upilex® film to protect the platens of the press from corrosion with any solvent remaining in the article. The time necessary to completely dry the article may of course vary depending on factors such as its dimensions, water content, and porosity, but will typically range up to a period of several days. The article may optionally be freeze-dried, as illustrated in Example 5, which will help prevent at least a portion of the porous structure of the article from collapsing as it is dried, in order to obtain a dried article with a higher porosity.

The time necessary to dry the article will depend on variables including its size, porosity, the polymer composition, and temperature. Preferably, the article is confined during the drying phase, in order to better retain its shape as it dries. Stainless steel plates, clamps and grips may be used to maintain the article in a fixed position while it undergoes drying. Preferably, the drying is conducted at ambient temperatures and pressures. Increased pressure during drying may affect the final dimensions of the dried part, since there may be greater shrinkage in the direction in which pressure is applied.

The incorporation of fillers or resins, compounds or polymers into the article, or the preparation of articles with a relatively high porosity, may be desirable for certain applications since such methods decrease the amount of lyotropic polymer necessary to prepare an article of a given size, may provide a more lightweight part, or have other benefits related to the properties of the material which is incorporated. Examples of suitable fillers include any inorganic fillers such as talc, mica, and chopped fibers. When employed, such fillers are preferably used in an amount in the range of from about 0.1 to about 80 percent by weight, based on the weight of the lyotropic polymer. Suitable compounds and polymers include any compound or polymers with a molecular weight of at least about 50, more preferably at least about 100, which may be incorporated into a porous structure using typical resin infiltration techniques. Preferably, the compound or polymer is and phenolic or epoxy resin, or a mixture of monomers which may be incorporated into the porous structure, and then polymerized, as illustrated in Example 7. Preferably, such compounds or polymers are incorporated into the porous structure by placing the porous article into a bath of the compound or polymer and applying reduced pressure to the container.

The porosity of articles prepared by the process of the invention is preferably in the range of from about 0.1 to about 20 percent. The porosity of the article may be increased by any suitable method, but is preferably increased by adding fibers, or resins having a low thermal stability, or a mixture thereof, to the dope before it is shaped. If fibers are used, they preferably have an aspect ratio (the ratio of the length to width) of at least about 2.0, since the packing of such fibers within the article will tend to increase the porosity of the article more than would be obtained using the same amount of a more spherical-shaped fiber. When employed, such fibers are preferably used in an amount in the range of from about 0.1 percent to about 80 percent by weight, based of the weight of the lyotropic polymer. Examples of such fibers include chopped fibers of glass and carbon.

Another technique to increase the porosity of the article is to mix the dope with a resin having a relatively low thermal stability. The dope is then shaped into the desired article, washed, and dried. The article is then heated sufficiently so that the resin undergoes pyrolysis and decomposes into gaseous fragments which may be removed from the article, thereby increasing its porosity. Suitable resins include any polymer having a molecular weight of at least about 100 which will undergo such pyrolysis at a temperature lower than that of the lyotropic polymer. When employed, such resins are preferably employed in an amount in the range of from about 0.01 percent to about 90 percent by volume, based on the weight of the washed and dried article. Preferably the resin is selected so that it will leave a relatively small amount of residue in the article after being burned. Most preferably, the resin is poly(methylmethacrylate).

Once the article prepared by the process of the invention is formed and washed (and preferably dried as well), it is suitable for any use where the physical properties and thermal- and fire-resistance properties of the polymer of which the article is comprised is useful. Example of such applications include electrical and fire-resistant cables and insulators, fire walls and cargo liners, brake pads, and high temperature applications such as aircraft or aerospace.

The articles prepared by the process of the invention have minimum dimensions of 0.05 inches (0.13 cm) in thickness, 0.05 inches (0.13 cm) in width and 0.05 inches (0.13 cm) in length. Preferably, the articles have a minimum dimension of 0.125 inches, more preferably at least about 0.25 inches, and most preferably at least about 1.0 inch. It has also been found to be possible to make parts with a width of at least 2 inches (5.08 cm) and also possible to make parts with a width of at least 4 inches (10.2 cm). However, the preferred overall final dimensions of a particular article will of course depend upon the intended use for the article. The articles of the second aspect of the invention may be prepared by the process of the first aspect of the invention described above.

ILLUSTRATIVE EMBODIMENTS

The following examples are given to illustrate the invention and should not be interpreted as limiting it in any way. Unless stated otherwise, all parts and percentages are given by weight.

EXAMPLE 1

Preparation of Extrudates

A fourteen weight percent solution of polybenzoxazole (having an inherent viscosity of about 27 in methanesulfonic acid at 23° C.) is prepared by polymerizing diaminoresoricinol-2HC1 and terephthalic acid in polyphosphoric acid (enriched with $P_2O_5$ to provide a $P_2O_5$ content of about 83.9 percent). This dope is loaded into a twin piston reactor attached to an extrusion die spin block with the through-put being controlled by using a Zenith™ gear pump. The dope is mixed and degassed in a twin piston reactor for three hours at 180° C.

Various extrusion dies are used to create three dimensional shaped articles of various shapes and sizes. These articles are extruded at temperatures ranging from 150° C.–170° C. They are extruded vertically and cut with a pair of stainless steel scissors. A portion of the articles are twisted manually into various shapes, wound around large diameter cylinders, or tied in a knot. All parts are then placed on a TEFLON™ sheet and allowed to equilibrate at ambient temperatures (70°–75° F. (21° C. to 24° C.)). Washing is conducted in over a period of approximately two weeks at temperatures ranging from 15° C. to 70° C. A portion of the articles are dried at ambient temperatures over a period of a week, and the rest are dried in a vacuum oven at 239° F. (115° C.) over a period of two days. The parts which are twisted or tied retain their overall shape after they are dried, although some deformation may occur. Articles washed and dried at lower temperatures retain their extruded shape better.

One article is washed for ten minutes, put into a vice and holes are drilled along its length. The article is then returned to the water bath for further washing, and is subsequently dried. The article retains its shape including the shape of the holes. Another article is wound on a metal rod prior to washing. The metal rod, with the article wound on it, is then washed. The article is then removed from the rod and dried. The shape created through winding is retained throughout the washing and drying, although it develops a slightly crooked shape during the drying process. Two other structures both extruded through the same I-beam shaped extrusion die are washed at conditions differing in the strength of the waterflow. The article washed in the slower water flow exhibits less shrinkage.

Another article is prepared by extruding PBO through a twin piston reactor. The extrudated has a diameter of about twelve inches and a cross-sectional length of at least about 1.5 inches. The article is washed for about two weeks. The phosphorous content of the article varies from between 1500 parts per million to 4000 parts per million throughout its thickness.

EXAMPLE 2
Molding of PBO Panel

A fourteen weight percent solution of polybenzoxazole is prepared as described in Example 1. A 1-kg portion of the dope is stirred in an extruder for about 4 hours at 170° C. to homogenize the dope and remove the major portion of any HCl present. The dope is then extruded as a 4 inch diameter round cylinder onto a sheet of non-reactive material such as Teflon™ (polytetrafluoroethylene polymer). The sheet is then wrapped around the extrudate to minimize contact of the dope with atmospheric moisture.

The extrudate is cut, while still hot from the extrusion process, by driving a ⅛ inch thick fiber glass panel through the dope using a press. The cut extrudate is removed from the press and the thin layer of material remaining at the location of the cut is trimmed with Aramid Eater-526-H scissors from ARS Edge Company, Ltd.

The Teflon™ film is removed from the charge, and the dope is then molded using the mold illustrated in FIGS. 1 and 2. The dope charge is compression molded into a 5 inch by 7 inch panel at elevated temperatures. A diaphragm of Upilex™ film is used as a liner in the mold to allow control of the mold chamber atmosphere and act as a release agent. After the mold is closed and sealed, atmospheric moisture is removed from the mold by purging with nitrogen or evacuation through the vent ports. The mold is then heated to at least about 70° C., and the dope is then pressed via the anvil using adequate pressure (about 20–80 psi) to fill the mold cavity. When the dope forms the desired article shape, the pressure is reduced to less than 10 psi and held for a period of 20 minutes to 1 hour to allow the article to cool. The panel is then removed from the mold and dry ice is then used to cool the polybenzoxazole panel in order to facilitate peeling of the Upliex™ film from either side of the panel.

Washing of the panel is performed in a cold tap water bath. Due to the tendency of the panel to distort if left in the bath unrestrained, the panel is confined using the support structure illustrated in FIG. 3. Acrylic plates (11) provide mechanical support while the ⅛" inch thick porous metal plates (10) having a porosity of 55 percent and a pore diameter of 100 about microns (available from Mott Metallurgical, Farmington, Conn.) allow water to reach the surface of the panel. Narrow, rigid spacers are used between the porous plates to provide channels through which water may flow as well as providing even pressure upon the panel. The plates and spacers are repositioned periodically to allow even exposure of the panel surface areas to water. The panel is washed for about three days.

The panel is then dried in a hot press at elevated temperatures using the sheet of foil or high temperature film such as Upilex™ to protect platens of the press from corrosion. The panel is dried for 2 hours at 115° C., followed by 2 hours at 150° C., at a pressure in range of from contact pressure (between the press and the panel, to in excess of 300 psi.

EXAMPLE 3
Steam Washing of PBO Panels

A charge of PBO dope is prepared and formed into a 5 inch by 7 inch by 0.5 inch panel as described in Example 2. Five samples measuring 1.5 inches by 1.5 inches by 0.5 inch are cut from one end of the panel using a bandsaw. The samples are placed in a steam chamber. The chamber is placed in a hot press at 115° C. to prevent condensation of steam within the cavity. Steam (30–40 psi) is allowed to pass freely through the cavity and around the samples. Brass shims, 0.040 inches thick, are placed on either side of the samples to act as spacers to allow exposure of the sample faces to the passing steam.

Figure 4:
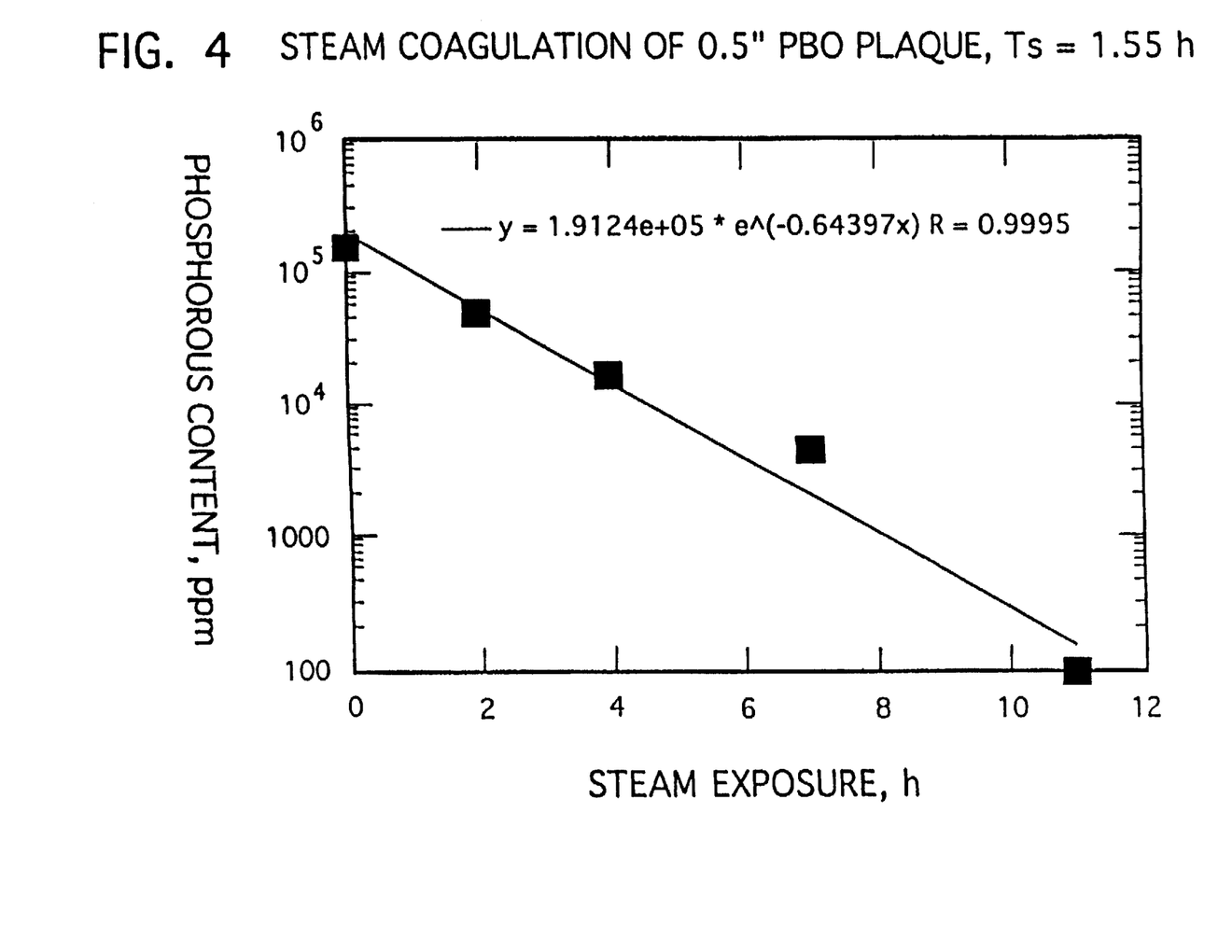
FIG. 4 shows residual phosphorous levels after steam coagulation of polybenzoxazole panels.

Initially, two samples are placed in the cavity, with a sample being removed at 2 hours and 4 hours exposure. Two additional samples are exposed for 7 hours and 11 hours in a second run. The fifth sample is not exposed to steam or otherwise washed. Residual phosphorous levels are analyzed using inductively coupled plasma emission spectroscopy, and the results of the steaming experiments are summarized in FIG. 4. The phosphorous content in parts per million (ppm) is plotted on Y-axis using logarithmic scale.

EXAMPLE 4
Article Prepared from PBO Dope Containing Chopped Glass Fibers

Chopped glass fibers (100 g of ⅛" fibers, available from CertainTeed) are mixed with 309 g of PBO dope (prepared as described in Example 2) at 140° C. for 20 minutes. The dope is then stored under nitrogen. Prior to molding, the dope is re-heated to 130° C. The molding of a plaque is done in a press at 120° C. in a 5 by 7 inch mold over a period of 3 hours. At the end of this period, the mold is cooled to a room temperature (approximately 24° C.) and the sample is washed in an apparatus as shown in FIG. 3. The weight of the sample prior to washing is 396 g. Its average thickness is 0.36 inches. After two weeks in the bath, the sample is removed, and weighs 217 g. Drying of the sample is done in a press following the procedure outlined in Table I. "Heating Rate" refers to the rate at which the sample is heated or cooled to reach the temperature shown in Column 1. "Holding Time" refers to the length of time the sample is held at the temperature shown in Column 1, after reaching such temperature.

TABLE I

| Step | Temp. °F. | Heating rate, ±°F./min | Force (lb.) | Holding Time |
|---|---|---|---|---|
| 1 | 238 | 15 | 20,000 | 4 hours |
| 2 | 400 | 5 | 20,000 | 2 hours |
| 3 | 75 | 10 | 20,000 | 3 min. |

After drying, the sample is cut with a diamond saw to dimensions of 16.6 cm by 11.5 cm by 0.43 cm. Its weight is 110 g and an apparent density is 1.3 g/cc. The calculated porosity of the sample is 32%.

EXAMPLE 5
Freeze Drying Followed by Resin Infiltration

A sample of PBO dope, prepared as described in Example 1, is extruded to dimensions of about 2 inches by 2 inches by 0.5 inch and positioned in a water bath and washed for about two weeks. The sample is then put inside a wide mouthed glass jar and freeze-dried as follows: the jar is kept at −50° C. for 4 hours, and then connected to a vacuum pump and kept for 14 hours between 5 and 10 umHg.

The sample is then positioned in a glass container connected to a vacuum pump and containing a mixture of isobornyl methacrylate monomer (available from Alcolac, CAS #7534–943) mixed with ½ weight percent of tert-butyl Peroctoate, (available from ATO Atochem Elf Aquitaine) as the initiator. Reduced pressure is applied for 5 minutes, and the PBO sample is submerged into the mixture for ten minutes. The mixture of monomers is then removed from the vessel and replaced with water to absorb exothermic energy during polymerization of the monomers which had penetrated the sample. The PBO sample saturated with the monomer and initiator and surrounded by water is positioned overnight in a nitrogen purged oven heated to 90° C. The weight of the sample after the polymerization is 23.0 g. The sample is then dried in a nitrogen-purged oven heated to 100° C. for two hours.

EXAMPLE 6
Preparation of a PBO/Fiberglass Composite

The laminate is prepared using a 5 inch by 7 inch (12.7 cm×17.8 cm) mold equipped with a close tolerance plunger. Fifteen rectangular pieces of fiberglass fabric (BGF Industries, Inc.) were cut to dimensions of 5 inches (12.7 cm) by 6.94 inches (17.6 cm). The fabric has 8HS weave, average thickness of 0.0096 inches (01024 cm), construction warp of 57 yarns per inch (22.4 yarns per cm) and 54 yarns per inch (21.2 yarns per cm) fill. PBO dope, prepared as described in Example 2, is extruded into sheets of 0.023 inch (0.058 cm) and 0.097 inch (0.25 cm). Fourteen sheets of PBO are used: 2 sheets of 0.097 inches (0.25 cm) thick for two outer layers and 12 sheets of 0.023 inches (0.058 cm) thick for internal layers.

The press is preheated for 30 minutes at 120° C. The mold is left at room temperature of 20° C. to allow an easy placement of alternating layers of PBO and fiberglass. To prevent exposure of the mold to polyphosphoric acid, a sheet of Upilex™ film is put on the bottom of the mold and on top of the PBO/fiberglass layers. The mold is then placed in a press and vacuum is pulled for 1.5 hours. Then the mold is heated in the press at 170° C. under a compression of 3,000 pounds (1,347 kgf) for 30 minutes. Then the compressive force is increased to 10,000 lbs (44,000 N or 4,500 kgf) and held for 1.5 hours to allow the dope to infiltrate the fiberglass. The press is then gradually cooled for 45 minutes with air and 10 minutes with water.

The composite is pressed out of the mold and washed in water at 23° C. for two weeks. The composite is then dried at 115° C. for 4 hours and 205° C. for 2 hours under 3000 lbs. (12,200 N) of force.

EXAMPLE 7
Porous Article From PBO/PMMA Mixture

Pellets of PMMA (poly(methyl methacrylate)) and PBO dope (prepared as described in Example 1) are mixed in a ratio of 15 parts by weight of PBO polymer per 100 parts PMMA, at 130° C. in a Haake mixer at 50 rpm for 60 minutes. The mixed material is pressed in 4.5 inches by 4.5 inches (11.4 cm by 11.4 cm) mold according to the procedure described in Example 2. The temperature and pressures applied during the molding process are summarized in the table.

| Step | Temp °C. | Heating Rate °C./min | Force, kN | Holding Time, min |
| --- | --- | --- | --- | --- |
| 1 | 158 | 20 | 8.8 | 15 |
| 2 | 266 | 15 | 7.0 | 30 |
| 3 | 75 | 10 | 7.0 | 3 |
| 4 | off | | | |

The sample is then washed in tap water for two weeks, according to the procedure described in Example 2. The 4.5×by 4.5 inch (11.4 cm×211.4 cm×1.27 cm) article is dried at 100° C. for 4 hours in a press under a load of 600 pound (2.6 kN).

To remove PMMA from the article, it is heated to 300° C. at the rate of 120° C./hr, heated for 8 hours at 300° C.; the temperature is ramped down to 20° C. at the rate of 20° C./min and held at this temperature for 5 hours. The weight of the sample prior to heating is 118, and is reduced by 34.1 g during the heating process. The resulting part is porous and sponge-like, having a calculated porosity of 87 percent.

EXAMPLE 8
Resin Infiltration of PBO Structure

A porous PBO panel is prepared as described in Example 2. An epoxy resin having a viscosity in the range of from 500–1000 centipoise at 23° C. and is heated at 130° C. while the mold is pre-heated to 66° C. After the resin has melted, a 5 inch by 7 inch mold is placed on a scale and a layer of resin is poured into the mold. Small pieces of fiberglass is added to the cavity, and the rest of the resin is poured into the mold and the PBO panel is then placed in the mold. The fiberglass pieces are used to help fill the mold cavity, prevent the use of an excessive amount of resin, and help keep the article from moving in the mold during fabrication. A sheet of Upilex™ film is placed on the mold and the mold is closed. A vacuum (approximately 30 inch Hg) is then pulled on the mold cavity for 40 minutes at room temperature. At the end of this time the mold (still under vacuum) and anvil are placed into the press and the cure schedule is started. When the temperature in step 1 of the cure schedule reached 110° C. (at this temperature the resin is melted and is just covering the vacuum port), the vacuum on the mold is terminated (by closing the mold valve), the anvil is placed on the mold, and the cure schedule is continued until completion. The cure schedule for the resin is as follows:

The degree of the infiltration is verified through use of ultrasonic analysis of the final part. A PBO preform may also be easily infiltrated by phenolic

| Step | Ramp | From | To | Holding Time | Pressure |
| --- | --- | --- | --- | --- | --- |
| 1 | 8.3° C./min | 21° C. | 135° C. | 45 min | 380 kPa |
| 2 | 2.8° C./min | 135° C. | 140° C. | 30 min | 1.59 MPa |
| 3 | 2.8° C./min | 140° C. | 150° C. | 60 min | 1.59 MPa |
| 4 | 2.8° C./min | 150° C. | 175° C. | 60 min | 1.59 MPa |
| 5 | 2.8° C./min | 175° C. | 200° C. | 120 min | 1.59 MPa |
| 6 | −5.6° C./min | 200° C. | 21° C. | 3 min | 1.59 MPa | resins in the above-described manner, providing a composite with fire and flame resistance.

EXAMPLE 9
Preparation of Article from an Aromatic Polyamide

Into a dry, 3-neck, 500 mL roundbottom flask is loaded N-methylpyrrolodinone (183.6 mL), toluene (50 mL), and a magnetic stir-bar. A Dean-Stark trap with condenser is attached to the flask and apparatus is padded with nitrogen via inlet and outlet adapters. Toluene is distilled off. The trap with condensor and stir-bar are removed from the flask upon cooling. A glass stir-shaft with Teflon™ blade is inserted into the flask for mechanical agitation. To the stirred, room temperature solvent is added dry calcium chloride (24 g). After about 3 hours, p-phenylene diamine (7.300 g) is added to the flask and agitated for ½ hour. The flask is chilled with an ice-water bath and terephthaloyl chloride (13.705 g) is added to the flask with N-methyl pyrrolidinone (10 mL) used to rinse down residual monomer. The reaction mixture is kept chilled for 30 minutes then allowed to warm temperature and sit overnight. The product is precipitated in deionized water in a blender and repeatedly washed until the wash water is neutral. The polymer is collected and dried to constant weight in an 100° C. vacuum oven. The inherent viscosity of the polymer is 2.5 dL/g (measured in concentrated H2SO4 at a concentration of 0.203 g/dL, and a temperature of 25.0° C.).

Into a 100 mL resin kettle is loaded poly-p-phenylene terepphthalamide (7.50 g) and 200.5% sulfuric acid (31.0 g). The mixture is warmed to 75° C. under nitrogen and forms a stir-opalescent solution. A 0.87 g portion of the dope is placed in a beaker and washed with water for about 20 hours. After washing, the article weighs 0.47 g.

What is claimed is:

1. A process for preparing a three-dimensional article of a lyotropic polymer comprising the steps of
   a) forming a shaped article of a liquid crystalline solution of a lyotropic polymer;
   (b) washing the shaped article with a washing fluid under conditions sufficient to reduce the solvent content of the article to less than about 2,000 parts per million, wherein the dimensions of the washed article are no less than 0.125 inches by 0.125 inches by 0.125 inches.

2. The process of claim 1 wherein the glass transition temperature of the lyotropic polymer is at least about 200° C.

3. The process of claim 2 wherein the lyotropic polymer is a polybenzoxazole polymer.

4. The process of claim 2 wherein the lyotropic polymer is a polybenzothiazole polymer.

5. The process of claim 1 wherein the lyotropic polymer is a polybenzoxazole or polybenzothiazole polymer having an inherent viscosity in the range of from about 10 to about 45 dL/g.

6. The process of claim 5 wherein the concentration of the lyotropic polymer in the liquid crystalline solution is at least about 14 percent by weight.

7. The process of claim 6 wherein the liquid crystalline solution contains polyphosphoric acid.

8. The process of claim 1 wherein the lyotropic polymer is an aromatic polyamide.

9. The process of claim 8 wherein the liquid crystalline solution contains sulphuric acid.

10. The process of claim 1 wherein the washing fluid comprises water.

11. The process of claim 1 wherein the washing fluid comprises steam.

12. The process of claim 1 which comprises the additional step of drying the washed article sufficiently to reduce the content of washing fluid to less than about 5 percent by weight.

13. The process of claim 12 wherein the article is dried by freeze-drying.

14. The process of claim 1 wherein the liquid crystalline polymer solution additionally comprises at least 0.1 to 80 percent by weight, based on the weight of the lyoptropic polymer, of fibers having an aspect ratio of at least about 2.0.

15. The process of claim 1 which additionally comprises the step of drying the washed article wherein the liquid crystalline polymer solution additionally comprises about 0.01 to 90 percent by volume, based on the weight of the washed and dried article, of a resin having a lower thermal stability than that of the lyotropic polymer, which comprises the additional step of heating the article under conditions sufficient to pyrolyze at least about 1 percent by weight of the resin.

16. The process of claim 12 wherein the dried article has a porosity of at least about 0.1 percent, comprises the additional step of infiltrating the porous article with a compound or polymer having a molecular weight of at least about 100.

17. The process of claim 1 wherein the shaped article is a multilayer composite of extrudates of the lyotropic liquid crystalline solution and fibers.

* * * * *